(12) United States Patent
Sun et al.

(10) Patent No.: US 11,164,047 B2
(45) Date of Patent: Nov. 2, 2021

(54) OBJECT DETECTION OPTIMIZATION

(71) Applicant: International Business Machines Corporation, Armonk, NY (US)

(72) Inventors: Ke Wei Sun, Beijing (CN); Junsong Wang, Beijing (CN); Yan GY Gong, Beijing (CN); Rong Yan, Beijing (CN); Yonghua Lin, Beijing (CN); Jie Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/518,014

(22) Filed: Jul. 22, 2019

(65) Prior Publication Data

US 2021/0027106 A1    Jan. 28, 2021

(51) Int. Cl.
*G06K 9/00* (2006.01)
*G06K 9/62* (2006.01)
*G06F 16/28* (2019.01)

(52) U.S. Cl.
CPC .......... *G06K 9/6262* (2013.01); *G06F 16/285* (2019.01); *G06K 9/628* (2013.01); *G06K 9/6261* (2013.01)

(58) Field of Classification Search
CPC .... G06K 9/6262; G06K 9/6261; G06K 9/628; G06F 16/285
See application file for complete search history.

(56) References Cited

U.S. PATENT DOCUMENTS

| 8,724,891 B2 | 5/2014 | Kiryati et al. |
| 2005/0185846 A1* | 8/2005 | Luo ............. G06K 9/00362 382/224 |
| 2011/0291925 A1 | 12/2011 | Israel et al. |
| 2014/0119608 A1* | 5/2014 | Lee ................ G06T 7/20 382/103 |

FOREIGN PATENT DOCUMENTS

CN          102968802 A        3/2013

* cited by examiner

*Primary Examiner* — Sean M Conner
(74) *Attorney, Agent, or Firm* — Patterson + Sheridan, LLP

(57) ABSTRACT

The present disclosure provides a computer-implemented method, computer system and computer program product for object detection. According to the computer-implemented method, a first object can be classified to be a first category based on detection data acquired in a detection area. Then, a confidence score for the first category can be calculated based on historical detection data of the detection area, wherein the confidence score presents possibility degree of at least one object of the first category existing in the detection area. Whether classification of the first object is abnormal can be determined based on the confidence score.

13 Claims, 5 Drawing Sheets

OBJECT DETECTION OPTIMIZATION

BACKGROUND

The present invention relates to object detection technology, and more specifically, to methods, systems, and computer program products for object detection optimization based on historical detection data.

Object detection technologies are widely used in various circumstances, such as factory assembly lines, traffic stations, and streets, etc. The detection can be implemented based on detection data (such as images, video data, audio data, and sensor data, etc.) captured in a detection area. For example, cameras can be deployed in the detection area to capture images or videos of the detection area, and objects in the detection area can be detected using the captured images or videos.

SUMMARY

According to one embodiment of the present invention, there is provided a computer-implemented method for object detection. According to the computer-implemented method, a first object can be classified to be a first category based on detection data acquired in a detection area. Then, a confidence score for the first category can be calculated based on historical detection data of the detection area, wherein the confidence score presents possibility degree of at least one object of the first category existing in the detection area. Whether classification of the first object is abnormal can be determined based on the confidence score.

According to another embodiment of the present invention, there is provided a computer system for object detection. The computer system comprises one or more processors, a computer-readable memory coupled to the one or more processors. The computer-readable memory comprises instructions that when executed by the one or more processors perform actions of: classifying a first object to be a first category based on detection data acquired in a detection area, calculating a confidence score for the first category based on historical detection data of the detection area, wherein the confidence score presenting possibility degree of at least one object of the first category existing in the detection area, and determining whether the classifying is abnormal based on the confidence score.

According to another embodiment of the present invention, there is provided a computer program product for object detection. The computer program product comprises a computer readable storage medium having program instructions embodied therewith, the program instructions executable by a processor to cause the processor to perform actions of: classifying a first object to be a first category based on detection data acquired in a detection area, calculating a confidence score for the first category based on historical detection data of the detection area, wherein the confidence score presenting possibility degree of at least one object of the first category existing in the detection area, and determining whether the classifying is abnormal based on the confidence score.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
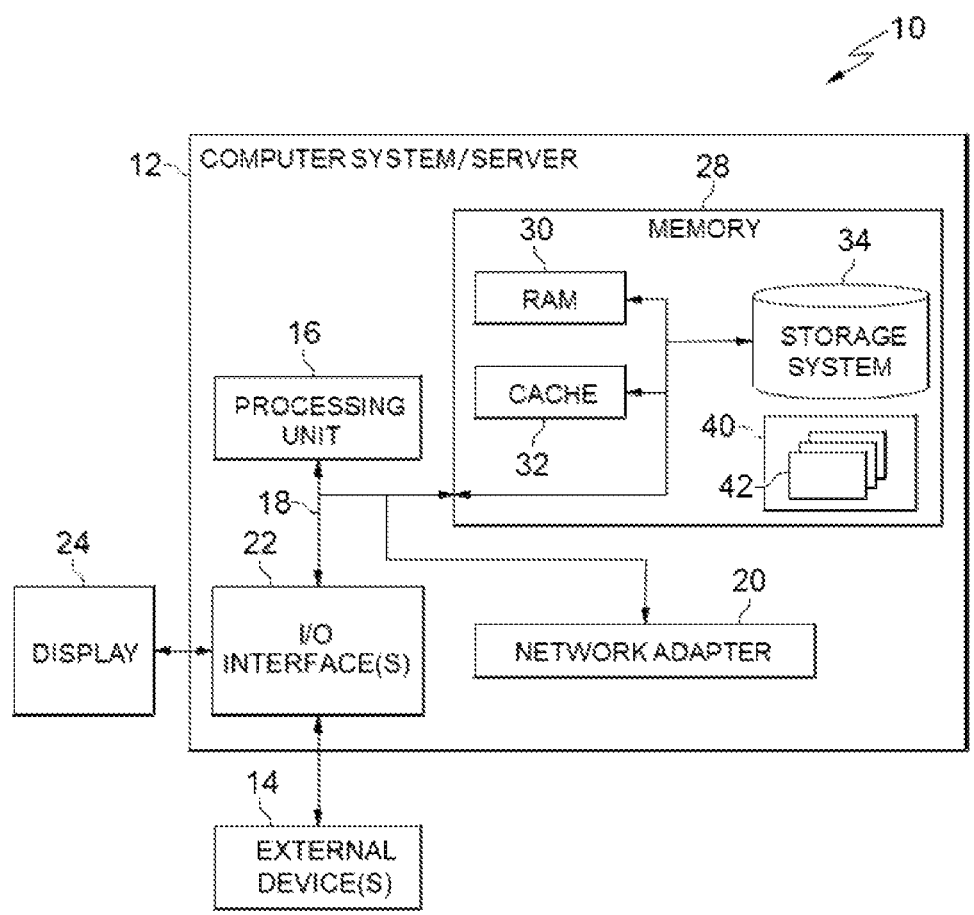
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
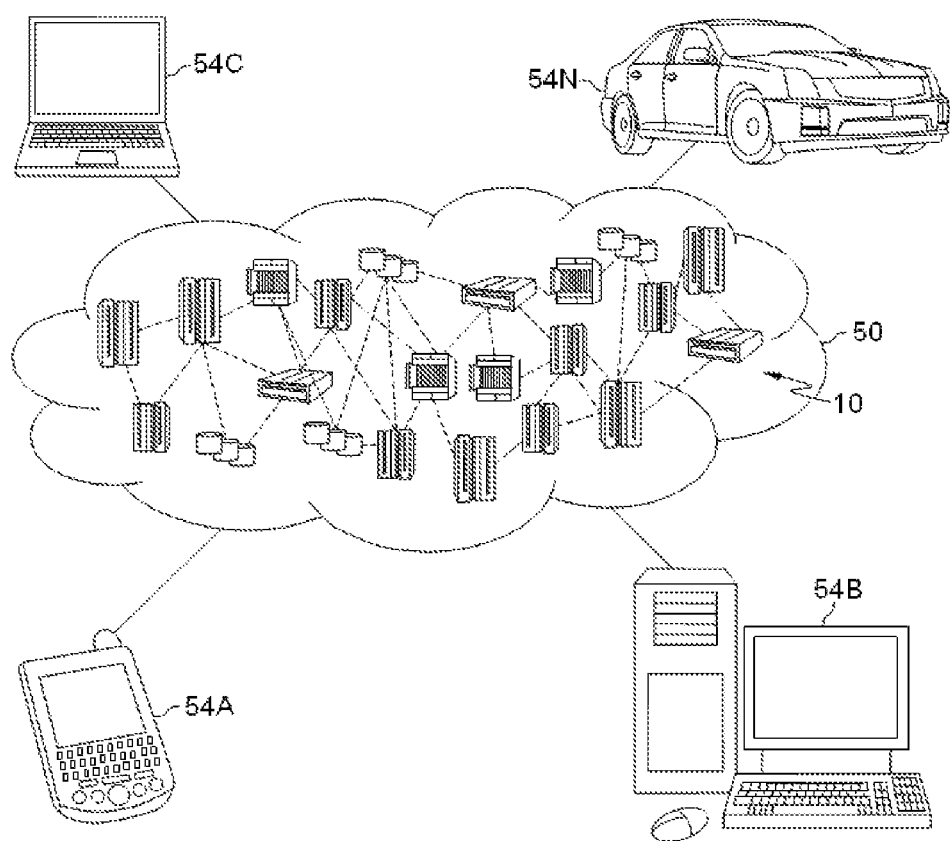
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
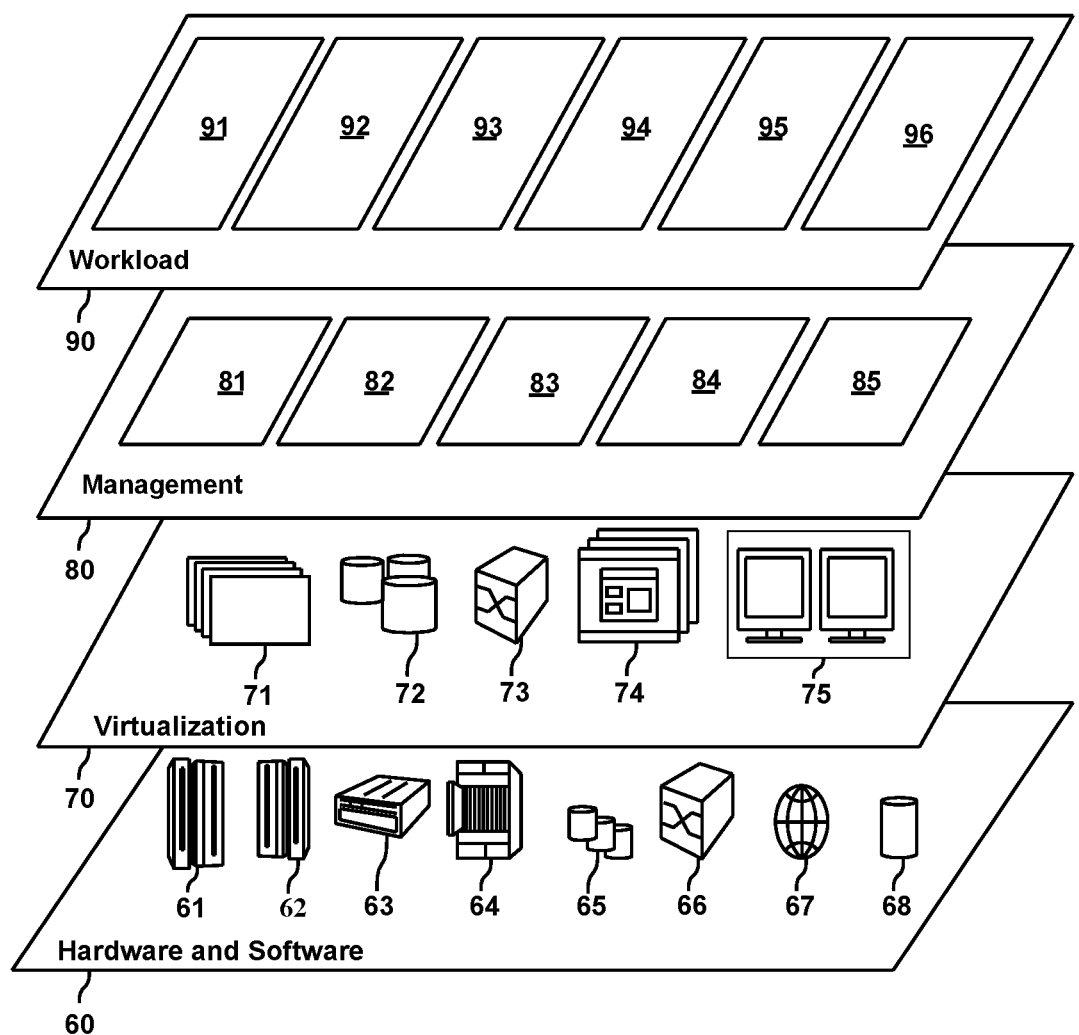
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object detection 96.

Object detection systems can be applied in various circumstances. Using object detection technologies, objects in a detection area can be detected and classified to different categories. If an object is detected to be a category of interest, the category and other information (such as time when the object is detected, and the like) of the object can be record in a database, and a notice can be sent to administrators or users of the detection systems for further processing.

However, errors may occur during the object detection. For example, a detected object in the detection area may be classified to be a false category. The administrators or users may have to manually check the category and corresponding detection data captured in the detection area in response to a false notice. This manual check is resource and time consuming.

Figure 4:
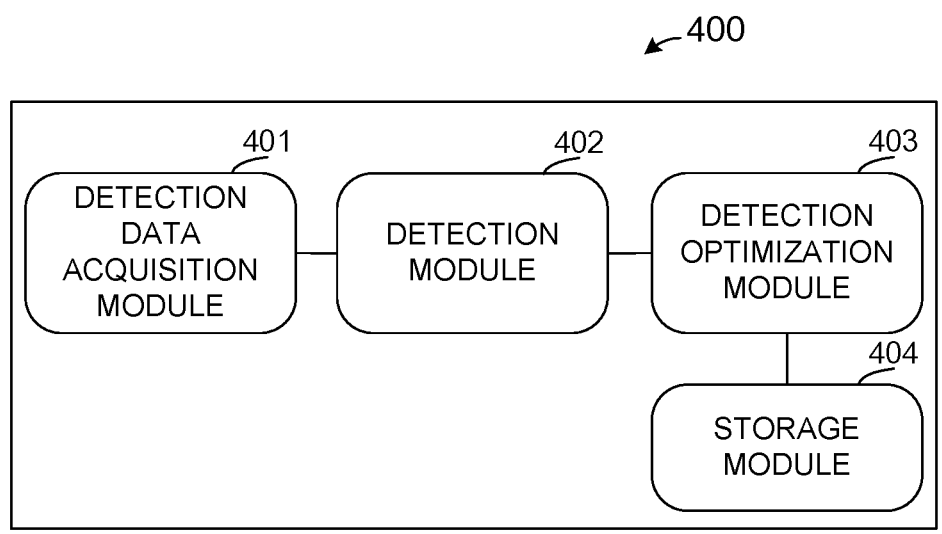
FIG. 4 depicts a schematic diagram of an object detection system according to an embodiment of the present invention.

Embodiments of the present invention provide approaches to optimize object detection. Referring now to FIG. 4, an exemplary object detection system 400 according to embodiments of the present invention is depicted. The object detection system 400 can be deployed for object detection in a detection area. In some embodiment, the object detection system 400 can be the computer system/server 12 of FIG. 1. The object detection system 400 comprises a detection data acquisition module 401, a detection module 402, a detection optimization module 403, and a storage module 404. It shall be understood that one or more modules not shown in FIG. 4 can also be comprised in the object detection system 400, and one or more modules shown in FIG. 4 can be divided into multiple sub-modules or combined as a single module.

According to embodiments of the present invention, detection data of a detection area can be acquired by the detection data acquisition module 401. The detection data comprises images, video data, audio data, and sensor data, etc. For example, the detection data acquisition module 401 connects to (via wired or wireless connection) or comprises a camera deployed in the detection area. Images or video clips of the detection area can be acquired by the detection data acquisition module 401 from the camera. By way of illustration, the detection data of images and video clips is described since it has higher complexity, and other types of detection data is straightforward to one of ordinary skill in the art based upon the description provided herein.

According to embodiments of the present invention, a first object can be detected by the detection module 402 based on the acquired detection data using detection technologies, which include image detection technologies, video detection technologies, and audio detection technologies, etc. A first category that the first object belongs to can be determined by the detection module 402 during the detection. It should be understood that many known or to be developed detection technologies can be applied by the present invention. Examples of the detection technologies comprise but not limited to: Convolutional Neural Network (CNN), fast R-CNN, Single Shot Detectors (SSD), You Only Look Once (YOLO), etc.

Figure 5:
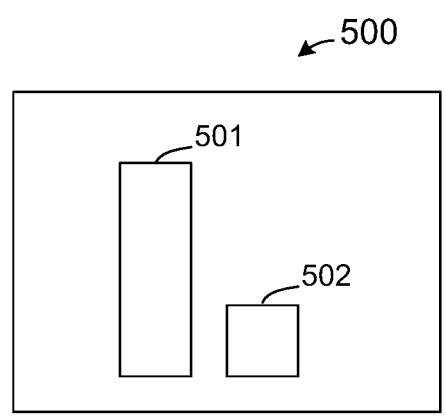
FIG. 5 depicts a schematic diagram of an image of a detection area according to an embodiment of the present invention.

Referring to FIG. 5, an exemplary image 500 in a detection area is depicted according to embodiments of the present invention. The image 500 can be acquired by the detection data acquisition module 401 as the detection data. The image 500 can be processed, by the detection module 402 using detection technologies, to comprise an object 501 and an object 502. As a specific example, the detection area can be an open area in a traffic station. The object 501 can be detected and classified to be a person (category "Human") passing the open area by the detection module 402 using one or more detection algorithms, and the object 502 can be detected and classified to be a cat (category "Cat") by the detection module 402 using one or more detection algorithms.

According to embodiments of the present invention, a confidence score for the first category can be calculated by the detection optimization module 403. The confidence score presents degree of confidence or possibility of at least one object of the first category existing in the detection area. For example, if a confidence score of a first category is higher than that of a second category in the detection area, an object of the first category is more likely or reasonable to exist in the detection area than an object of the second category.

In some embodiments, historical detection data of the detection area can be acquired by the detection optimization module 403 from the storage module 404. The historical detection data of the detection area can be divided by the detection optimization module 403 into multiple data sections. The multiple data sections can be successive or discrete in timeline of the historical detection data. For example, each of the multiple data sections can correspond to successive time periods (for example, 09:00-10:00, 10:00-11:00, 11:00-12:00, etc. of a day), which means the multiple data sections are successive in the timeline of the historical detection data. In another example, each of the multiple data sections can correspond to discrete time periods (for example, 09:00-12:00, 14:00-17:00, 19:00-22:00, etc.), which means each data section is discrete from another data section in the timeline of the historical detection data. Then the detection optimization module 403 can calculate an occurrence count of at least one object of the first category in each of the multiple data sections of the detection area. The detection optimization module 403 calculates the confidence score for the first category based on occurrence counts of the multiple data sections. In some embodiments, the sum of calculated occurrence counts of the multiple data sections can be calculated by the detection optimization module 403 as the confidence score. In some other embodiments, an average value of the calculated occurrence counts of the multiple data sections can be calculated by the detection optimization module 403 as the confidence score.

In some embodiments, the detection optimization module 403 can also assign weights to the occurrence counts of the multiple data sections according to characteristics (such as, timestamps or other factors) of the multiple data sections and calculate the confidence score for the first category based on the occurrence counts and corresponding assigned weights. As an example, for a first data section which is closer to the detection time point of the first object than a second data section, a higher weight can be assigned by the detection optimization module 403 to the first data section and a lower weight can be assigned to the second data section. In this example, the detection time point of the first object can correspond to the time when the first object is detected by the detection module 402.

Figure 6:
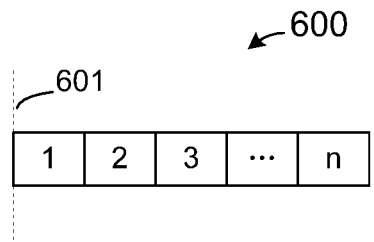
FIG. 6 depicts a schematic diagram of a video stream of a detection area according to an embodiment of the present invention.

In some embodiments, historical detection data of the first category can comprise detection video stream of the detection area. The video stream can be divided into multiple video sections based on a timeline of the video stream by the detection optimization module 403. The multiple video sections can be successive or discrete in timeline of the video stream. Referring to FIG. 6, an exemplary video stream 600 of the detection area is depicted according to embodiments of the present invention. The video stream 600 comprises n video sections from a detection time point 601 of the first object, and each of the n sections has a same duration. As an example, n can be set as 48 and each duration of the 48 sections can be 30 minutes, which means video stream of the latest 24 hours from the detection time point 601 can be processed. As another example, n can be set as 7 and each duration of the 7 sections can be 24 hours, which means video stream of the latest 7 days from the detection time point 601 will be processed. As a further example, n can be set as 7 and each of the 7 sections can correspond to a same duration of a day (for example, 09:00-17:00), which means video stream of the specific time period (09:00-17:00) of the latest 7 days from the detection time point 601 can be processed. It should be noted that amount, durations, and time periods of the video sections can also be set by administrators or users of the object detection system 400 as needed. In this example, time period of the video section 1 is closest to the detection time point 601 of the first object. An occurrence count of at least one object of the first category in each of the multiple sections (section 1-section n) can then be calculated by the detection optimization module 403. As a further example, if an object of the first category exists in a video section of the detection area, the occurrence count for the video section can be set as 1. As a further example, if another object of the first category exists in the video section, the occurrence count for the video section can be added by 1.

In some embodiments, if an object of the first category is detected by the object detection system 400, a timestamp corresponding to detection time point of the object can be recorded in the storage module 404. Then, recorded timestamps of objects of the first category can be acquired by the detection optimization module 403 to calculate the occurrence counts of the multiple data sections. In some other embodiments, the detection optimization module 403 can use detection technologies to detect objects of the first category in each of the multiple data sections to calculate the occurrence counts of the multiple data sections.

In Table 1, exemplary records of a category "Cat" are illustrated. It should be understood that Table 1 and following tables provided by the present invention are only intended to describe embodiments of the present invention. For example, "Object 1" of the category "Cat" is detected by the object detection system 400 on "2019.05.01, 15:01", a timestamp "2019.05.01, 15:01" can be recorded in Table 1; and "Object 2" of the category "Cat" is detected by the object detection system 400 on "2019.05.01, 16:45", a timestamp "2019.05.01, 16:45" can be recorded in Table 1. In this example, if a video section is set by the detection optimization module 403 as from 2019.05.01 00:00 to 2019.05.01 23:59, the occurrence count of objects of the category "Cat" in the video section can be counted to be 2.

TABLE 1

| Category | Object | Timestamp |
|---|---|---|
| Cat | Object 1 | 2019.05.01, 15:01 |
| Cat | Object 2 | 2019.05.01, 16:45 |
| . . . | . . . | . . . |

In some embodiments, based on characteristics of the detection video sections, weights can be assigned to the occurrence counts of the multiple data sections. As an example, the detection optimization module 403 can calculate the confidence score for the first category based on the occurrence counts and corresponding weights using the following formula:

$$\text{confidence\_score} = \sum_{i=1}^{n-1} \frac{1}{i} \text{occurrence\_count}_i,$$

wherein confidence_score represents the confidence score for the first category, n represents the number of the video sections, i represents an index of each video section from the detection time point of the first object (the time period of the video section 1 is closest to the detection time point), and $\text{occurrence\_count}_i$ represents the occurrence count of objects of the first category in the section i.

As an example, n can be set to be 7, each duration of 7 video sections can be set to be 24 hours, which means video stream of the latest 7 days from the detection time point 601 can be processed. The index i can be set to be from 1 to 7 for each of the 7 video sections in an order of time period (such as, time period of section 1 is closest to the detection time point of the first object, and time period of section 7 is farthest from the detection time point). A weight 1/i is assigned to the occurrence count of section i. The confidence score confidence_score can be a weighted sum of the occurrence counts of the 7 sections.

According to embodiments of the present invention, whether classification of the first object to be the first category mentioned above is abnormal can be determined by the detection optimization module 403 based on the confidence score. As an example, if the confidence score exceeds a preset threshold, the classification of the first object can be determined to be normal. If the confidence score does not exceed the preset threshold, the classification of the first object can be determined to be abnormal.

In some other embodiments, if the confidence score does not exceed the preset threshold, one or more verified categories of one or more objects existing in the detection area can be acquired by the detection optimization module 403. The verified categories have confidence scores exceeding corresponding preset thresholds. If the first category can be mapped to at least one of the one or more verified categories, the detection optimization module 403 can also determine the classification of the first object to be normal. If the first category can be mapped to none of the one or more verified categories, the detection optimization module 403 can determine the classification of the first object to be abnormal. In these embodiments, if the confidence score of the first category is lower than the preset threshold, the detection optimization module 403 can also directly determine the classification of the first object to be abnormal. It should be understood that the above-mentioned thresholds can be set individually by the administrators or users of the detection system 400 as needed or by the detection system 400 using machine learning technologies.

According to embodiments of the present invention, if the classification of the first object is determined to be normal, the first category can be record by the detection optimization module 403 as a verified category in the storage module 404. The verified category can be saved in a format of list, table, or other data structure, and the like in the storage module 404. If the first category has already been recorded in the storage module 404 as a verified category, the detection optimization module 403 can bypass adding the first category in the storage module 404.

In some embodiments, if the classification of the first object is determined to be normal, a timestamp corresponding the detection time point of the first object can be recorded by the detection optimization module 403 in the storage module 404. In these embodiments, the timestamp of the first object can be recorded in a table format (similar to Table 1) in the storage module 404. Then, the recorded timestamp of the first object can further be used for calculating an updated confidence score of the first category by the detection optimization module 403 subsequently. In some embodiments, a label indicating the classification of the first object is normal can also be record by the detection optimization module 403 in the storage module 404.

In some other embodiments, if the classification of the first object is determined to be abnormal, while the detection optimization module 403 finds the first category already recorded in the storage module 404 as a verified category, the detection optimization module 403 can delete the record which indicates the first category to be a verified category.

In some other embodiments, if the classification of the first object is determined to be abnormal, a timestamp corresponding to the detection time point of the first object of the first category can also be recorded by the detection optimization module 403 in the storage module 404. In this example, the first category can be assigned a label indicating the classification of the first object is abnormal in the storage module 404.

In some embodiments, during subsequent calculation of a confidence score of the first category, the detection optimization module 403 can only use records of the first category stored in the storage module 404 with the label indicating normal classification (such as, the label "Normal" used in below Table 2). In some other embodiments, the detection optimization module 403 can use all records of the first category, including records with the label indicating normal classification (such as, the label "Normal" used in below Table 2) and records with the label indicating abnormal classification (such as, the label "Abnormal" used in below Table 2), to calculate the confidence score.

In Table 2, an example of recorded timestamps of a category "Toy Cat" and a category "Cat" is illustrated. In the example of Table 2, Object 2 is classified to be the category "Cat", which is labeled as abnormal. The record of "Object 2" can still be selected for calculating a confidence score of the category "Cat" by the detection optimization module 403 subsequently. In some other embodiment, the record of "Object 2" can be omitted in calculating a confidence score of the category "Cat" by the detection optimization module 403 subsequently.

TABLE 2

| Category | Normal or Abnormal? | Object | Timestamp |
| --- | --- | --- | --- |
| Toy Cat | Normal | Object 1 | 2019.05.01, 15:01 |
| Cat | Abnormal | Object 2 | 2019.05.01, 16:45 |
| . . . | . . . | . . . | . . . |

In some embodiments, multiple objects of multiple categories can be detected by the detection module 402 concurrently (such as, detection time points of the multiple objects of multiple categories are the substantial similar or have a required time offset). If classification of each of the multiple objects to be each of the multiple categories is determined to be normal, the multiple categories can be recorded in the storage module 404 as mapping categories.

In Table 3, an example of records of a category "Toy Cat" and a category "Human" in the storage module 404 is illustrated. In this example, as "Object 1" of the category "Toy Cat" and "Object 2" of the category "Human" are detected concurrently by the detection module 402 and classification of "Object 1" (to be the category "Toy Cat") and classification of "Object 2" (to be the category "Human") are determined to be normal by the detection optimization module 403, the category "Toy Cat" can be set to be mapped to the category "Human" by the detection optimization module 403. An entry indicating the mapping of the category "Toy Cat" and the category "Human" can be created in a mapping table stored in the storage module 404.

TABLE 3

| Category | Normal or Abnormal? | Object | Timestamp |
| --- | --- | --- | --- |
| Toy Cat | Normal | Object 1 | 2019.05.01, 15:01 |
| Human | Normal | Object 2 | 2019.05.01, 15:01 |
| . . . | . . . | . . . | . . . |

In some embodiments, if concurrent occurrence times of an object of a first category (such as, the category "Toy Cat") and an object of a second category (such as, the category "Human") exceeds a preset threshold, the detection optimization module 403 can set the first category to be mapped to the second category in the mapping table.

In Table 4, an example of records of a category "Toy Cat" and a category "Human" in the storage module 404 is illustrated. In this example, an object of the category "Toy Cat" and an object of the category "Human" are detected concurrently more than preset times (such as, 2 times) and each time classification is labeled as normal (i.e. the classification of the category "Toy Cat" and the category "Human" are determined to be normal each time), the detection optimization module 403 can add an entry in the mapping table indicating that the category "Toy Cat" can be mapped to the category "Human". It should be understood that the preset times can be set by the administrators or users of the detection system 400 as needed or set by the detection system 400 using machine learning technologies.

TABLE 4

| Category | Normal or Abnormal? | Object | Timestamp |
| --- | --- | --- | --- |
| Toy Cat | Normal | Object 1 | 2019.05.01, 15:01 |
| Human | Normal | Object 2 | 2019.05.01, 15:01 |
| Toy Cat | Normal | Object 3 | 2019.05.02, 09:01 |
| Human | Normal | Object 4 | 2019.05.02, 09:01 |
| Toy Cat | Normal | Object 5 | 2019.05.03, 10:01 |
| Human | Normal | Object 6 | 2019.05.03, 10:01 |
| . . . | . . . | . . . | . . . |

In Table 5, an exemplary mapping table in the storage module 404 is illustrated. In this example, a mapping entry "Mapping Entry 1" record indicates that the category "Toy Cat" can be mapped to the category "Human" for a detection area "Area 1". A mapping entry "Mapping Entry 2" record indicates that the category "Luggage Bag" can be mapped to the category "Human" for the detection area "Area 1".

TABLE 5

| Entry | Detection Area | Category A | Category B |
| --- | --- | --- | --- |
| Mapping Entry 1 | Area 1 | Toy Cat | Human |
| Mapping Entry 2 | Area 1 | Luggage Bag | Human |
| . . . | | . . . | . . . |

In some embodiments, a mapping table of categories can be established for the detection area using machine learning algorithms or set by administrators or users of the detection system 400. For example, the administrators or users of the detection system 400 can set the category "Human" and the category "Luggage Bag" as mapping categories for a detection area in a traffic station, and an entry can be record in the mapping table, such as "Mapping Entry 2" in Table 5.

In some embodiments, if the classification of the first object to be the first category is determined to be abnormal, the detection optimization module 403 can send a notice message (indicating the classification of the first object to be the first category is abnormal) to the detection module 402 to optimize detection algorithms used by the detection module 402. For example, the first object can be adjusted by the detection module 402 from belonging to the first category to belonging to a second category, wherein the second category is also an output of the detection algorithms. Classification of the first object to be the second category can further be determined to be normal or abnormal using above-mentioned methods.

As an example, it is assumed that an object is detected by the detection module 402 to be the category "Cat" and another object is detected to be the category "Human" concurrently. If the confidence score of the category "Cat" calculated by the detection optimization module 403 is lower than the preset threshold, the detection optimization module 403 can send a notice message to the detection module 402 indicating that classification of the object to be the category "Cat" is abnormal. Responsive to receiving the notice message, the detection module 402 may adjust the object from the category "Cat" to the category "Toy Cat" which is also an output category of detection algorithms. In some embodiments, if the category "Toy Cat" has a confidence score exceeding the preset threshold, the classification of the object to be the category "Toy Cat" can be determined to be normal. In some other embodiments, if the category "Toy Cat" has a confidence score not exceeding the preset threshold, but there is an entry can be found in the mapping table indicating that the category "Toy Cat" can be mapped to the category "Human", the classification of the object to be the category "Toy Cat" can also be determined to be normal.

Figure 7:
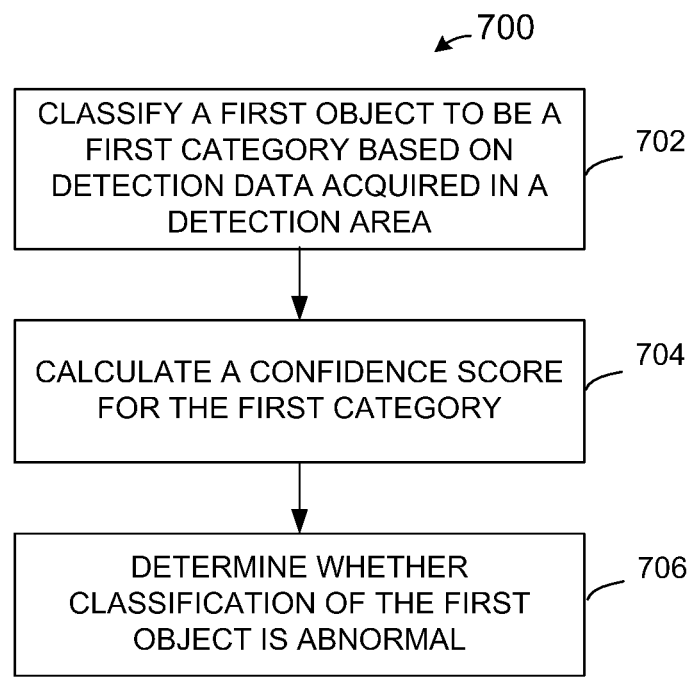
FIG. 7 depicts a flow chart of an example method for object detection according to an embodiment of the present invention.

With reference to FIG. 7, a method 700 for object detection is illustrated according to embodiments of the invention. The method 700 can be implemented by the computer system/server 12 of FIG. 1 or a computer node 10 in a cloud system. It should be noted that the method 700 is only illustrative and is not intended to suggest any limitation as to the scope of use or functionality of embodiments of the present invention.

At step 702, a first object can be classified to be a first category based on detection data acquired in a detection area. At step 704, a confidence score for the first category can be calculated based on historical detection data of the detection area. In some embodiments, the confidence score presents possibility degree of at least one object of the first category existing in the detection area. Then at step 706, whether classification of the first object at step 702 is abnormal can be determined based on the confidence score.

It should be noted that the processing of object detection according to embodiments of the present invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for object detection, comprising:
   classifying, by one or more processors, a first object to be a first category based on detection data acquired in a detection area;
   dividing, by one or more processors, historical detection data of the detection area into multiple data sections;
   calculating, by one or more processors, an occurrence count of at least one object of the first category existing in each of the multiple data sections;
   assigning, by one or more processors, a weight to each of the calculated occurrence counts according to characteristics of each of the multiple data sections;
   calculating, by one or more processors, a confidence score for the first category based on the calculated occurrence counts and the assigned weights, wherein the confidence score presents a possibility degree of at least one object of the first category existing in the detection area;
   determining, by one or more processors, whether the classifying is abnormal based on the confidence score; and
   in response to the classifying being determined to be normal, recording, by one or more processors, the first category as a verified category in a database.

2. The method of claim 1, wherein determining whether the classifying is abnormal further comprises in response to the confidence score not exceeding a preset threshold, determining, by one or more processors, the classifying to be abnormal.

3. The method of claim 1, wherein determining whether the classifying is abnormal further comprises, in response to the confidence score not exceeding a preset threshold:
   acquiring, by one or more processors, one or more verified categories corresponding to the detection area, wherein confidence scores of the verified categories exceed corresponding thresholds; and
   determining, by one or more processors, the classifying to be abnormal in response to the first category mapping with none of the one or more verified categories.

4. The method of claim 1, further comprising in response to concurrence of an object of a second category and an object of the first category exceeding preset times based on the historical detection data of the detection area, creating, by one or more processors, an entry in the database indicating that the first category is mapping with the second category.

5. The method of claim 1, further comprising in response to the classifying being determined to be abnormal, adjusting, by one or more processors, the first object from the first category to a third category.

6. The method of claim 1, further comprising recording, by one or more processors, a timestamp corresponding to a detection time point of the first object of the first category in the database.

7. The method of claim 1, wherein the detection data comprises images or video clips captured by a camera deployed in the detection area.

8. A computer system for object detection, comprising:
   one or more processors;
   a computer-readable memory coupled to the processors, the computer-readable memory comprising instructions that when executed by the processors perform actions of:
      classifying a first object to be a first category based on detection data acquired in a detection area;
      dividing historical detection data of the detection area into multiple data sections;
      calculating an occurrence count of at least one object of the first category existing in each of the multiple data sections;
      assigning a weight to each of the calculated occurrence counts according to characteristics of each of the multiple data sections;
      calculating a confidence score for the first category based on the calculated occurrence counts and the assigned weights, wherein the confidence score presents a possibility degree of at least one object of the first category existing in the detection area;
      determining whether the classifying is abnormal based on the confidence score; and
      in response to the classifying being determined to be normal, recording, by one or more processors, the first category as a verified category in a database.

9. The computer system of claim 8, wherein determining whether the classifying is abnormal further comprises in response to the confidence score not exceeding a preset threshold, determining the classifying to be abnormal.

10. The computer system of claim 8, wherein determining whether the classifying is abnormal further comprises in response to the confidence score not exceeding a preset threshold:
   acquiring one or more verified categories corresponding to the detection area, wherein confidence scores of the verified categories exceed corresponding thresholds; and determining the classifying to be abnormal in response to the first category mapping with none of the one or more verified categories.

11. The computer system of claim 8, further comprising in response to concurrence of an object of a second category and an object of the first category exceeding preset times based on the historical detection data of the detection area, creating an entry in a database indicating that the first category is mapping with the second category.

12. The computer system of claim 8, further comprising in response to the classifying being determined to be abnormal, adjusting the first object from the first category to a third category.

13. A computer program product, comprising a computer readable storage medium having program instructions embodied therewith, the program instructions executable by a processor to cause the processor to perform actions of:

classifying a first object to be a first category based on detection data acquired in a detection area;

dividing, by one or more processors, historical detection data of the detection area into multiple data sections;

calculating, by one or more processors, an occurrence count of at least one object of the first category existing in each of the multiple data sections;

assigning, by one or more processors, a weight to each of the calculated occurrence counts according to characteristics of each of the multiple data sections;

calculating, by one or more processors, a confidence score for the first category based on the calculated occurrence counts and the assigned weights, wherein the confidence score presents a possibility degree of at least one object of the first category existing in the detection area;

determining whether the classifying is abnormal based on the confidence score; and in response to the classifying being determined to be normal, recording, by one or more processors, the first category as a verified category in a database.

\* \* \* \* \*